Sept. 5, 1939.  A. W. SCOTT  2,172,091
WEATHER STRIP
Filed April 7, 1938
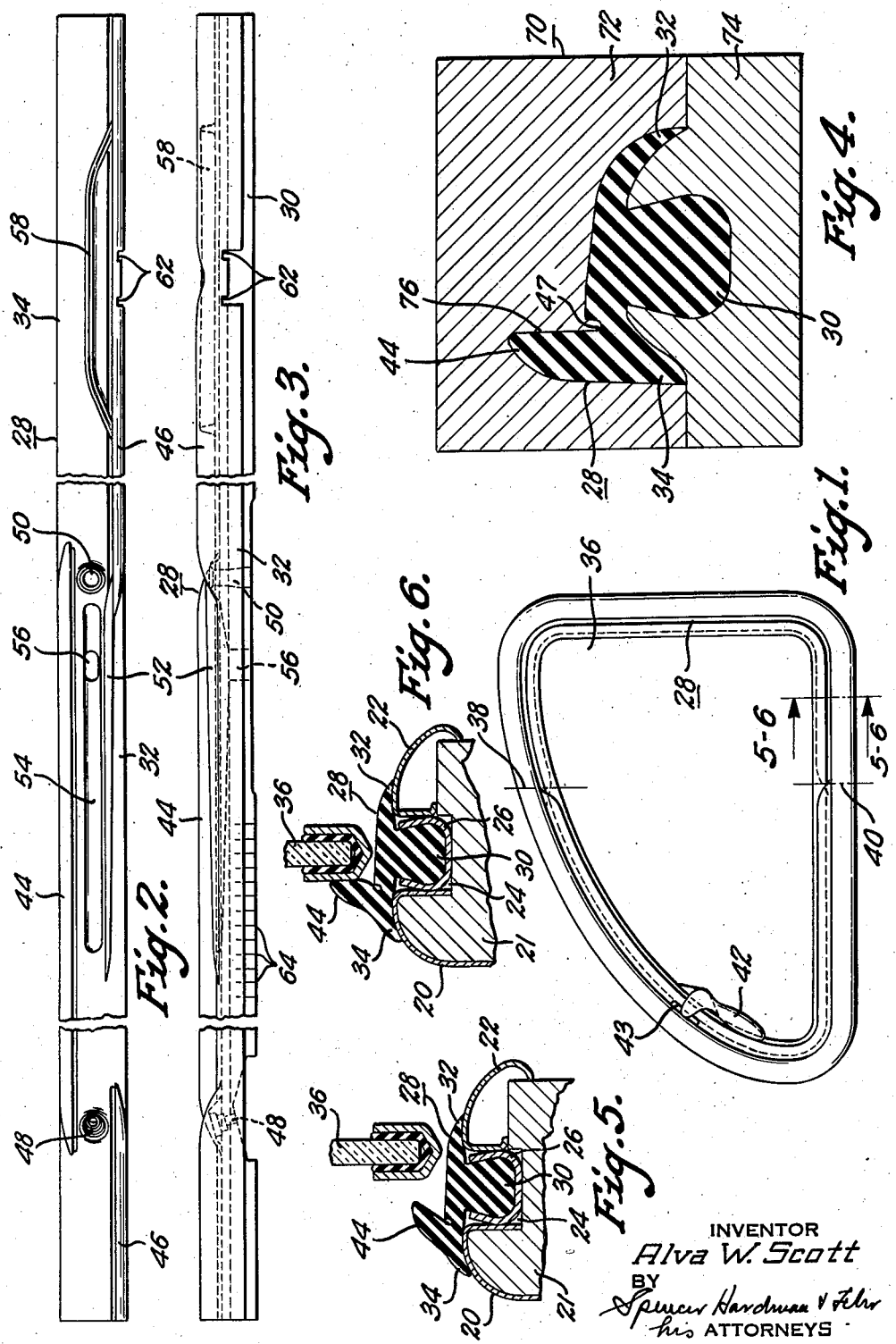
INVENTOR
Alva W. Scott
BY
Spencer Hardman & Felix
his ATTORNEYS Patented Sept. 5, 1939

2,172,091

UNITED STATES PATENT OFFICE 2,172,091

WEATHER STRIP

Alva W. Scott, Dayton, Ohio, assignor to General Motors Corporation, Detroit, Mich., a corporation of Delaware Application April 7, 1938, Serial No. 200,581

8 Claims. (Cl. 20—69)

This invention relates to a resilient weather strip for use in connection with windows and more particularly to a weather strip for use with the movable ventilating windows of automobiles.

Resilient weather strips are now in general use in connection with windows on automobiles and the present invention is particularly concerned with weather strips used in connection with the small ventilating windows of automobiles in which the window is rotated around a vertical axis in order to open the same. Such a weather strip usually has outwardly extending flanges thereon which seal against the window frame when the same is in closed position to prevent drafts from entering the body of the car and likewise has flanges thereon which conceal the joint between the body panels and the frame of the window.

In the past it has been necessary to mold the rubber-like weatherstrip material in long strips in which the window sealing flanges thereon were placed at an angle to the vertical so that upon closure of the window the flanges were flexed to vertical position thus causing the flanges to sealingly engage the window. Such a construction presented manufacturing difficulties and required expensive mold equipment which included removable insert pieces in the mold in order to form the weatherstrip having such flanges thereon.

The present invention is directed to a weatherstrip of rubber or rubber-like material in which the flanges for sealing against the window frame are substantially vertical and in fact have a slight draft thereon to facilitate the molding thereof.

It is therefore one of the objects of the invention to provide a weather strip which is less expensive and easier to manufacture than the weather strip used in the past and which performs the sealing function with greater efficiency.

It is a further object of the invention to provide downwardly extending flanges in opposed position to the window sealing flanges so that when the weather strip is assembled with the body panel that the first mentioned flanges are flexed to cause the window sealing flanges to be thrown inwardly toward the window and thereby be in position to resiliently seal against the window when the same is closed.

Another object of the invention is to provide a notch or weakened portion along the junction of the window sealing flange and the main body of the weather strip which notch weakens the resilient material and thereby permits flexing of the window sealing flanges with less effort than would otherwise be required.

Still another object of the invention is to provide a long length of weather strip material which may be cut to the developed length of the window frame and then may be vulcanized together at the ends thereof so that it can subsequently be snapped into place in a groove around a window opening and thereby be held in position with respect to the window opening while simultaneously overlapping and concealing the edges of the groove.

Further objects and advantages of the present invention will be apparent from the following description, reference being had to the accompanying drawing wherein a preferred embodiment of the present invention is clearly shown.

In the drawing:

Fig. 1 illustrates a window frame and window in the closed position showing the weather strip in place.

Fig. 2 is a fragmentary plan view of the weather strip as used in connection with a window frame.

Fig. 3 is a side view of the strip shown in Fig. 2.

Fig. 4 is a sectional view taken through the molding die showing the weather strip therein.

Fig. 5 is a view taken on line 5—5 of Fig. 1 with the window in a partially opened position, and Fig. 6 is a view taken on the line 6—6 of Fig. 1 wherein the window is in closed position.

Referring to the drawing and particularly to Fig. 5, 20 designates a portion of a body panel which is preferably supported by a frame member 21. 22 is a removable window frame which is secured in any suitable manner, such as by screws, to the frame member 21. The panel 20 and the window frame 22 are spaced from one another and the frame member 21 is grooved as at 24 which groove registers with the space between the panel 20 and window frame 22. A channel or U-shaped member 26 is disposed within the groove 24 and is bent to shape so as to conform with the configuration of the window frame 22. The channel 26 extends completely around the window frame within the groove 24 and as will be observed by referring to the drawing is slightly larger at the bottom thereof than at the top. The channel 26 may be snapped within the groove 24 and if desired may be fixed to the frame member 21 by screws or may be welded to either the body panel 20 or to the window frame 22. In any case, the channel 26 is held within the groove 24 and completely surrounds the window opening.

A weather strip 28 is provided and is formed so as to have a base portion 30 thereon having a dove-tailed cross section. The portion 30 is disposed to snap into the channel 26 and due to the dove tailed shape thereof is firmly held within the channel 26 to prevent displacement of the weather strip 28. The strip 28 has an outwardly extending flange 32 thereon which overlies the edge of the window frame 22 and is also provided with a flange 34 which overlies the edge of the body panel 20. Thus the weather strip 28 covers and completely conceals the edges of the body panel 20 and window frame 22 when it is assembled around the window opening.

A window 36 is pivotally mounted at 38 and 40 within the window frame and is rotatable around its pivots when it is desired to open the same. A latch 42 is provided on the window 36 for latching the window closed and operates against a lug 43 on the window frame.

The weather strip 28 also includes an upwardly extending flange 44 which seals against the window when the same is closed as noted in Fig. 6. The flange 44 is molded substantially vertically with respect to the portion 30 of the weather strip and is undercut or notched as at 47 to weaken the junction between the flange 44 and the remainder of the weatherstrip 28. Due to the construction of the strip when the same is snapped into place within the channel 26, the flange 34 thereon is flexed upwardly which causes the associated flange 44 to flex inwardly as noted in Fig. 5. When the window is closed the flange 44 is flexed outwardly by the window to sealingly engage the rim of the window. The undercut portion 47 permits ready flexing of the flange 44 with a minimum of effort.

Referring to Figs. 2 and 3 it will be noted that another portion of the weatherstrip is provided with a flange 46 thereon which is substantially similar to flange 44 but on the opposite side of the strip. Two holes 48 and 50 are provided through the strip for permitting passage of pivot pins for the window. The flanges 44 and 46 are disposed on opposite sides of the weather strip and thus seal against the window when it is closed without presenting any obstacle to the same when it is being opened since there are no upwardly extending flanges in the path of the opening window. An auxiliary lip 52 extending upwardly from the weatherstrip 28, on the side opposite to flange 44 provides additional sealing surface adjacent the lower pivot when the window is closed and is sufficiently compressed when the window is being opened to permit the window to readily pass thereover.

A groove 54 is preferably molded within the weathership 28 between the lip 52 and flange 44 and has an aperture 56 therein to permit the draining of any water which collects at the bottom of the window thus preventing the water from seeping into the interior of the car as the window is opened.

A second auxiliary lip 58 is molded on the weather-strip 28 adjacent the latch lug 43. The lip 58 is flexed against the flange 46 when the weather strip is in place and thereby seals the weather strip around the latch lug 43 which is fitted within the grooves 62 molded or cut in the weather-strip. A plurality of notches or slits 64 are cut into the base portion 30 of the weatherstrip adjacent the corners of the window to permit ready curving of the weather strip 28 around the corners as the strip is assembled to the frame. If preferred the strip 28 may be vulcanized together at the ends thereof prior to its insertion within the channel 26.

Referring to Fig. 4 a cross-section of the mold 5 is shown, which includes an upper die portion 72 and a lower die portion 74. It is apparent from the drawing that the flange 44 is molded with a slight draft as at 76 which facilitates the molding thereof as well as the removal thereof from the mold. The undercut 47 is also molded directly into the weathership. It will be observed that the flanges 32 and 34 are molded in such a position relative to the portion 30 of the weathership that they are necessarily flexed considerably upon assembly within the window frame. This flexing, as previously explained, provides a good sealing contact between the flanges 32 and 34, the window frame 22, and the body panel 20 respectively, as well as causing the flanges 44 and 46 to be flexed inwardly toward the window and thereby resiliently sealingly engage the window when the same is in closed position.

From the foregoing it will be observed that I have provided a weatherstrip for ventilating windows which is very efficient in sealing the window closed and which may be fabricated with greater ease than has heretofore been possible in the fabrication of weatherstrips for similar purposes.

While the embodiment of the present invention as herein disclosed, constitutes a preferred form, it is to be understood that other forms might be adopted, all coming within the scope of the claims which follow.

What is claimed is as follows:

1. A weatherstrip for use in ventilator windows, comprising; a solid section base portion adapted to be held within a groove in a window frame, a flange portion extending outwardly and downwardly from said base portion for covering the edges of the window frame, and a second flange portion extending upwardly from said base portion for sealingly engaging the window, said first flange portion being flexed upwardly with respect to the base portion when the base portion is associated with the window frame, for causing the second flange portion to be flexed inwardly toward the window.

2. A weatherstrip for use in ventilator windows, comprising; a base portion adapted to be associated with a window frame, a flange portion extending outwardly and downwardly from said base portion for covering the edges of the window frame, a second flange portion extending upwardly from said portion for sealingly engaging the window, a groove at the junction of the second flange portion and the base portion, said first flange portion being flexed upwardly with respect to the base portion when the base portion is associated with the window frame, for causing the second flange portion to be flexed at said groove toward said window, said groove lessening the resistance of the second flange toward flexing.

3. A sealing assembly for sealing a window to its frame comprising, a weatherstrip having a base portion thereon adapted to be held within a window frame, two opposed outwardly extending flange portions thereon, one of which overlaps the edge of the window frame and the other of which sealingly engages the window when the same is in closed position, said overlapping flange being flexed upwardly with respect to the base portion when the base portion is assembled to the window frame for causing the window sealing flange to be flexed inwardly toward the window for sealingly engaging the window.

4. A sealing assembly for sealing a window to its frame comprising, a weatherstrip having a base portion thereon, two opposed outwardly extending flange portions thereon for overlapping the edge of the window frame and for sealingly engaging the window when the same is in closed position, said overlapping flange being flexed with respect to the base portion when the base portion is assembled to the window frame, for causing the window sealing flange to sealingly engage the window, and a weakened portion at the junction between the window sealing flange and the base portion for facilitating the sealing engagement of the window sealing flange.

5. A resilient weatherstrip for use in ventilator windows which have recessed frames comprising, a base portion of solid cross-section adapted to snap into the recessed frame of the window for holding the strip to the window, a flange extending outwardly and downwardly from one side of said base portion and being flexed upwardly when in position with respect to the window frame for sealingly engaging the frame and concealing the edge of the frame recess, a T shaped flange extending from the base at the other side thereof and including a connecting neck portion and an upwardly extending sealing member and a cooperating downwardly extending sealing flange, said cooperating downwardly extending sealing flange being flexed upwardly when the strip is inserted in the recess for concealing the edge of the recess and for causing the said sealing member to flex inwardly toward the base portion.

6. A resilient weatherstrip for use in ventilator windows which have recessed frames comprising, a base portion of solid cross-section adapted to snap into the recessed frame of the window for holding the strip to the window, a flange extending outwardly and downwardly from one side of said base portion and being flexed upwardly when in position with respect to the window frame for sealingly engaging the frame and concealing the edge of the frame recess, a T shaped flange extending from the base at the other side and including a connecting neck portion and an upwardly extending sealing member and a cooperating downwardly extending sealing flange, said cooperating downwardly extending sealing flange being flexed upwardly when the strip is inserted in the recess for concealing the edge of the recess and for causing the said sealing member to flex inwardly toward the base portion, and a weakened portion comprising a longitudinal groove at the junction of the upwardly extending sealing member and said neck portion for increasing the flexibility of said sealing member.

7. A resilient weather strip for use in windows which have recessed frames comprising, a base portion of solid cross-section adapted to snap into the recessed frame of the window for holding the strip to the window frame, a T-shaped flange extending from the base and including a connecting neck portion and a window sealing flange and a frame sealing flange, said frame sealing flange being flexed when the strip is inserted in the recess of the frame and causing the window sealing flange to flex toward the window.

8. A resilient weather strip for use in windows which have recessed frames comprising, a base portion of solid cross-section adapted to snap into the recessed frame of the window for holding the strip to the window frame, a T-shaped flange extending from the base and including a connecting neck portion and a window sealing flange and a frame sealing flange, said frame sealing flange being flexed when the strip is inserted in the recess of the frame and causing the window sealing flange to flex toward the window, and a longitudinal groove in said neck portion for facilitating the flexing of the window sealing flange toward the window.

ALVA W. SCOTT.